United States Patent [19]

Bullard et al.

[11] Patent Number: 4,813,859

[45] Date of Patent: Mar. 21, 1989

[54] APPARATUS FOR MOLDING EXPANDABLE POLYSTYRENE FOAM ARTICLES

[76] Inventors: Calvin P. Bullard, 467 Mountain Rd., Wilbraham, Mass. 01095; F. Paul Szubelick, 857 Armory St., Springfield, Mass. 01107

[21] Appl. No.: 34,435

[22] Filed: Apr. 3, 1987

[51] Int. Cl.$^4$ ............................................... B28B 1/50
[52] U.S. Cl. .................................... 425/4 R; 425/143; 425/446; 425/817 R
[58] Field of Search ........... 425/4 R, 143, 446, 817 R; 264/40.1, 40.6, 51, 53, 101

[56] References Cited

U.S. PATENT DOCUMENTS

| | | | |
|---|---|---|---|
| Re. 27,243 | 12/1971 | Sare et al. | 161/42 |
| 3,081,488 | 3/1963 | Caasavina et al. | 264/51 |
| 3,086,248 | 4/1963 | Culp | 18/48 |
| 3,225,126 | 12/1965 | Bridges et al. | 264/51 |
| 3,233,016 | 2/1966 | Kracht | 264/53 |
| 3,243,485 | 3/1966 | Griffen | 264/57 |
| 3,278,658 | 10/1966 | Immel | 264/51 |
| 3,410,931 | 11/1968 | Johnson | 264/45 |
| 3,419,648 | 12/1968 | Leach | 264/53 |
| 3,594,461 | 7/1971 | Jacob | 264/51 |
| 3,767,744 | 10/1973 | Holl | 264/51 |
| 3,809,735 | 5/1974 | Cotterell | 264/53 |
| 3,837,769 | 9/1974 | Erlenbach | 425/4 R |

FOREIGN PATENT DOCUMENTS

| | | | |
|---|---|---|---|
| 2940815 | 4/1981 | Fed. Rep. of Germany | 264/51 |
| 2449518 | 10/1980 | France | 425/4 R |
| 6371 | 1/1978 | Japan | 264/53 |
| 6730 | 1/1982 | Japan | 264/40.6 |
| 182411 | 11/1982 | Japan | 264/40.1 |
| 112430 | 6/1985 | Japan | 264/40.1 |
| 511113 | 9/1971 | Switzerland | 264/51 |

*Primary Examiner*—Bernard Nozick
*Attorney, Agent, or Firm*—Morgan & Finnegan

[57] ABSTRACT

A device for executing a method of molding expandable thermoplastic polymer beads in a mold to form articles of foamed material comprising: pulsing steam through at least one of the cavities to contact and expand the beads in the cavity for a finite period of time and drawing the steam amongst the beads by providing reduced pressure to at least one of the cavities for the same period of time; and pulsing mist through the expanded beads by providing mist to at least one of the cavities and drawing the mist through the expanded beads by providing reduced pressure to at least one of the cavities for the finite period of time of predetermined duration to form articles of foamed material. The device for molding beads of expandable polystyrene into articles comprises: a mold member mounted to a platen to form a cavity between the mold and platen, core vents formed in the mold, means for introducing steam into the cavity, means for applying reduced pressure to the cavity, and means for introducing mist into the cavity.

8 Claims, 6 Drawing Sheets

APPARATUS FOR MOLDING EXPANDABLE POLYSTYRENE FOAM ARTICLES

FIELD OF THE INVENTION

This invention relates to a time and energy efficient method and apparatus for molding expandable polystyrene into articles of foamed material.

BACKGROUND OF THE INVENTION

The process and apparatus of present invention concern the thermal cycles of molding expandable polystyrene (hereinafter "EPS") into useful articles made of what is commonly called "styrofoam".

Known methods for molding EPS begin with the step of filling a mold with EPS beads. The beads are small hollow polystyrene spheres filled with a gas expansion agent. The molds are usually made of cast aluminum and consist of two halves. Each half is mounted onto a platen to form a "mold assembly" and create a steam cavity behind each side of the mold. Generally, one or both of the platens is moveable to allow separation of the two sides of the mold and thereby facilitate removal of the item being produced.

Once the mold is filled with beads, the next step in EPS molding is a heat cycle to heat the mold and beads to expand and fuse the beads to form the product. The steam cavity behind one half of the mold is filled with steam. This steam is drawn through core vents into the bead-filled mold cavity by applying a vacuum behind the other half of the mold. The direction of flow of the steam can be reversed by switching the location of the source of steam and the vacuum being applied.

U.S. Pat. No. 4,272,469, to Smith, describes this type of heating cycle wherein the flow of steam lasts "a period of time" before reversing its direction. (Column 2, line 65–column 3, line 4 and column 8, lines 12–13). The Smith heating cycle takes two minutes or longer, as seen in Examples 1 and 2. (Column 8, lines 23–62). U.S. Pat. No. 4,557,881, to Rabotski also describes this type of heating cycle wherein the steam flows for ten seconds in each direction and is then supplied from both sides of the mold for twenty seconds. (Column 8, lines 44–54). Both Smith and Rabotski rely on a timed cycle to determine when the beads have been sufficiently heated, rather than a measurement of the temperature of the beads.

When the heat cycle is complete, a cooling cycle is initiated. Cooling the mold and product therein brings internal bead pressure near zero thereby preventing expansion and facilitating ejectment. In Rabotski, many gallons of cold water are sprayed onto the mold halves to cool the mold, and hence the product therein, before the product is ejected from the mold. (column 9, lines 9–30). Heat sensors monitor the temperature of the cooling water and regulate the length of the cooling cycle. This method of cooling will generally require a re-heating of the mold before subsequent heating cycles are initiated. The evaporation of water which may be present within the product due to condensation of the steam used for heating is another recognized method for cooling the product. See, for example, U.S. Pat. No. 3,015,851 to Wiles at column 6, lines 22–25, U.S. Pat. No. 3,312,760 to Berner at column 2, lines 59–64 and U.S. Pat. No. 4,272,469 to Smith at column 8, lines 38–48.

Other relevant references include: U.S. Pat. No. 3,042,967 to Edberg; U.S. Pat. No. 3,264,381 to Stevens; U.S. Pat. No. 3,274,643 to Oxel; and U.S. Pat. No. 4,439,122 to Besse et al.

In present practice of the prior art processes a total production cycle time for producing EPS articles is no less than 90 to 120 seconds and is often longer. Further, present prevailing practice requires tremendous energy expenses to heat the mold and its contents, subsequently, cool the mold and then reheat the mold to begin a new cycle. The vast majority of the energy requirement is to heat the mold which has a much denser mass than the EPS product inside, thus, requiring additional heat energy for its heating and reheating for each cycle.

The method and apparatus of the present invention represent improvements over these prior art processes by reducing energy requirements and greatly reducing the length of both the heating and cooling cycle. The present invention represents an important and exciting new process because it avoids the energy wasteful heating and reheating of the mold parts by instead concentrating the heat requirements directly on the product materials. The product materials are traditionally less dense and therefore less heat energy demanding than the mold materials and by heating the product materials directly heat requirements are reduced without any loss of process performance. The present invention, which utilizes a direct method for heating and cooling the product, permits a revolutionary reduction in process cycle time from the traditional minimum of 90 to 120 seconds to a cycle time of 24 seconds or less. This reduced time requirement contributes to energy efficiency and increases time output plant product. Even further energy efficiency is achieved because the requisite amount of steam required for molding can be precisely determined in accordance with preferred methods of the invention thus reducing unnecessary waste.

SUMMARY OF THE INVENTION

It is therefore an object of the present invention to provide a novel method and apparatus for molding expandable polystyrene which is both time and energy efficient.

Additional objects and advantages of the invention will be set forth, in part, in the description which follows and in part will be apparent from this description, or may be learned by the practice of the invention. The objects and advantages of the invention are realized and obtained by means of the methods, apparatus and the combinations particularly pointed out in the appended claims.

As embodied and fully described herein, the invention comprises a method of molding expandable thermoplastic polymer beads in a mold having at least two separable portions each mounted on a platen to form a mold assembly with a cavity behind each portion of the mold to form articles of foamed material, comprising the steps of: introducing the beads into the mold; pulsing steam amongst the beads to contact, expand and fuse the beads by providing steam to at least one cavity for a predetermined period of time and drawing the steam amongst the beads by providing reduced pressure to at least one other of the cavities for the same period of time; and pulsing mist through the expanded beads by providing mist to at least one other of the cavities and drawing the mist through the expanded and fused beads by providing reduced pressure to at least one other of the cavities for a period of time of the same predetermined duration to form an article of foamed material.

In preferred embodiments of the invention the steam is pulsed amongst the beads more than once and in more than one direction.

In further preferred embodiments of the invention the temperature of the beads is monitored and the pulsing of steam and mist is controlled based on the temperature of the beads, such that, the pulsing of steam continues until the beads are heated to a predetermined temperature and the pulsing of mist continues until the beads are cooled to a predetermined temperature.

In other particularly preferred embodiments of the invention the steam is provided to at least one of the cavities for pulses of one to three seconds, the reduced pressure or vacuum is applied in pulses of from one to three seconds and the mist is provided in pulses of from one to three seconds in duration. Articles of foamed material are preferably formed in a steam cycle of from 5 to 15 seconds, with the entire molding process being performed in 30 seconds or less.

As embodied and fully described herein, the apparatus of the invention comprises a device for molding beads of expandable polystyrene into articles comprising: a platen; a mold member mounted to the platen so as to form a mold assembly having a cavity between the mold and the platen; core vents formed in the mold member; means for introducing steam into the cavity; a means for applying reduced pressure to the cavity; and means for introducing mist into the cavity.

In preferred embodiments of the invention the device further comprises means for regulating the introduction of the steam and the application of the reduced pressure. In more preferred embodiments regulating means comprise: valves which can be rapidly switched from an open to a closed position by electronic signal, and means for generating electronic signals to open and close the valves.

It is to be understood that both the foregoing general and the following detailed description are exemplary and explanatory only and are not intended to be restrictive of the invention as claimed.

BRIEF DESCRIPTION OF THE DRAWINGS

A preferred embodiment of the invention is described in detail by way of reference to the accompanying drawings, in which.

DETAILED DESCRIPTION OF THE PREFERRED EMBODIMENTS OF THE INVENTION

Reference will now be made in detail to present preferred embodiments of the invention, an example of which is illustrated in the following example section.

In accordance with the invention, the process or method of the present invention is performed after the mold cavity is filled with beads and involves a heat cycle characterized by oscillating, short pulses of steam which are pulled through the beads in more than one direction in order to heat the beads to the requisite temperature. The pulse is created by providing a supply of steam behind one portion of the mold containing the beads and applying reduced pressure behind the opposite portion of the mold. By quickly reversing the location of the source of steam and the reduced pressure being applied, a short pulse of steam is drawn through the beads in a different direction. This rapid change of direction insures exposure of substantially all surfaces of the beads to the heat source.

These rapid pulses of steam are directed to heat only the beads and not the mold. Since the steam is constantly in motion, the heat transfer to the beads is extremely efficient. Additionally, using a vacuum to draw the steam through the beads provides a friendly or conducive atmosphere for the required expansion of the beads.

The process of the present invention further involves a novel cooling cycle characterized by oscillating, short pulses of fog or mist which are pulled through the product in more than one direction in order to cool the expanded bead product sufficiently prior to ejectment from the mold. The fog or mist comprises water droplets which are generally no greater than five microns in size to facilitate their passing through the expanded bead product. The pulse is created by providing a supply of fog or mist at one portion of the mold containing the now heated product and applying a reduced pressure or vacuum to the opposite portion of the mold. By quickly reversing the location of the source of mist and the vacuum being applied a pulse of mist is drawn through the product in a different direction, thus assuring exposure of substantially all areas of the product to the cooling agent (e.g. the mist).

Again, only the product and not the mold is being cooled. This reduces the volume of water which must be supplied as mist or fog and greatly reduces the length of the cooling cycle. Additionally, since the product to be cooled is at a temperature above the flash point of water, the mist is vaporized upon contact with the hot product. This novel utilization of change of state is so efficient and so fast that it causes tremendously efficient heat transfer and results in virtually instantaneous cooling of the product without significantly cooling the mold materials. Furthermore, since only the product, and not the mold, are cooled, the mold is already preheated to begin a subsequent heating cycle, thus no re-heating of the mold is required further reducing energy consumption.

The intrinsic energy efficiencies from the process are recognized when one considers that the process performs a direct heating and cooling action on the product and not on both the product and the mold. It should be noted that the product has substantially less mass than the mold and often the mold will be up to 300 times heavier than the product formed inside. Recognizing that the invention avoids continuous heating of the mass intensive mold leads to an appreciation of the tremendous energy saving potential of the invention.

The process of the present invention also involves monitoring the temperature of the beads during the entire molding process. Thus, only the number of pulses required to raise the temperature of the beads to the desired temperature are generated, minimizing the time involved in heating and the energy expended for producing steam. Similarly, the cooling time is optimized by providing only the number of pulses of mist required to reduce the temperature of the beads to the desired temperature.

The process of present invention is performed by the apparatus of the present invention, a uniquely designed pair of mold assemblies wherein the two halves of the mold are each mounted to a backplate on a platen to create a steam cavity between the mold and the backplate. A manifold is formed across the top and bottom of the structure of each platen. The manifolds extend into each steam cavity behind each half of the mold. The top manifold is connected to both steam and vacuum lines. Steam/vacuum ducts and high pressure fog/mist nozzles alternate along the length of manifold pointing into the steam cavity. High speed valves allow rapid switching from steam to vacuum and back to steam, etc. The high speed vacuum and steam valves are electronically controlled during the heat cycle by known circuitry such that when steam is being supplied behind one half of the mold, vacuum is applied behind the other and vice versa. Rapid pulses of steam are thus generated for the heat cycle. Core vents on each half of the mold allow the steam to pass through the beads. The core vents are misaligned to encourage the steam to vary its path through the beads. A commercially available, rapidly reacting resistance temperature device (hereinafter "R.T.D.") is mounted on the platen and extends through the mold and into the beads. The R.T.D. monitors the temperature of the beads. When the R.T.D. indicates that the beads have reached a temperature sufficient to convert the beads into the desired product (around 200° F.), the heating cycle ends and the cooling cycle is initiated.

The high pressure fog/mist nozzles remain on continuously during the cooling cycle to provide a uniform fog or mist. Vents to the atmosphere are also controlled by high speed valves. During the cooling cycle, the high speed vacuum and air vent valves are electronically controlled such that when vacuum is being applied behind one half of the mold, the air vent is open behind the other. Rapid pulses of mist or fog are thus generated for the cooling cycle. When the R.T.D. indicates that the product is sufficiently cooled (to approximately 180° F.) the cooling cycle is terminated and the mold opens to eject the product.

In a preferred embodiment of the present invention, one of the mold assemblies is stationary and the other is movable. Through a unique design, the hydraulic cylinders used for moving the movable mold assembly are mounted entirely behind the stationary platen. This allows easy access to the mold halves, the product, and facilitates the orientation of a conveyer system directly below the mold assemblies for easy removal of the products thus formed.

The products formed by the process of the invention have been found to possess superior properties such as smooth product surface or skin.

The process and apparatus of present invention for molding EPS create tremendous energy and time savings when compared to conventional techniques while producing a product of equivalent or improved strength and quality. These and other benefits of the present invention will be apparent to one skilled in the art from the further description, drawings and claims which follow.

Figure 1:
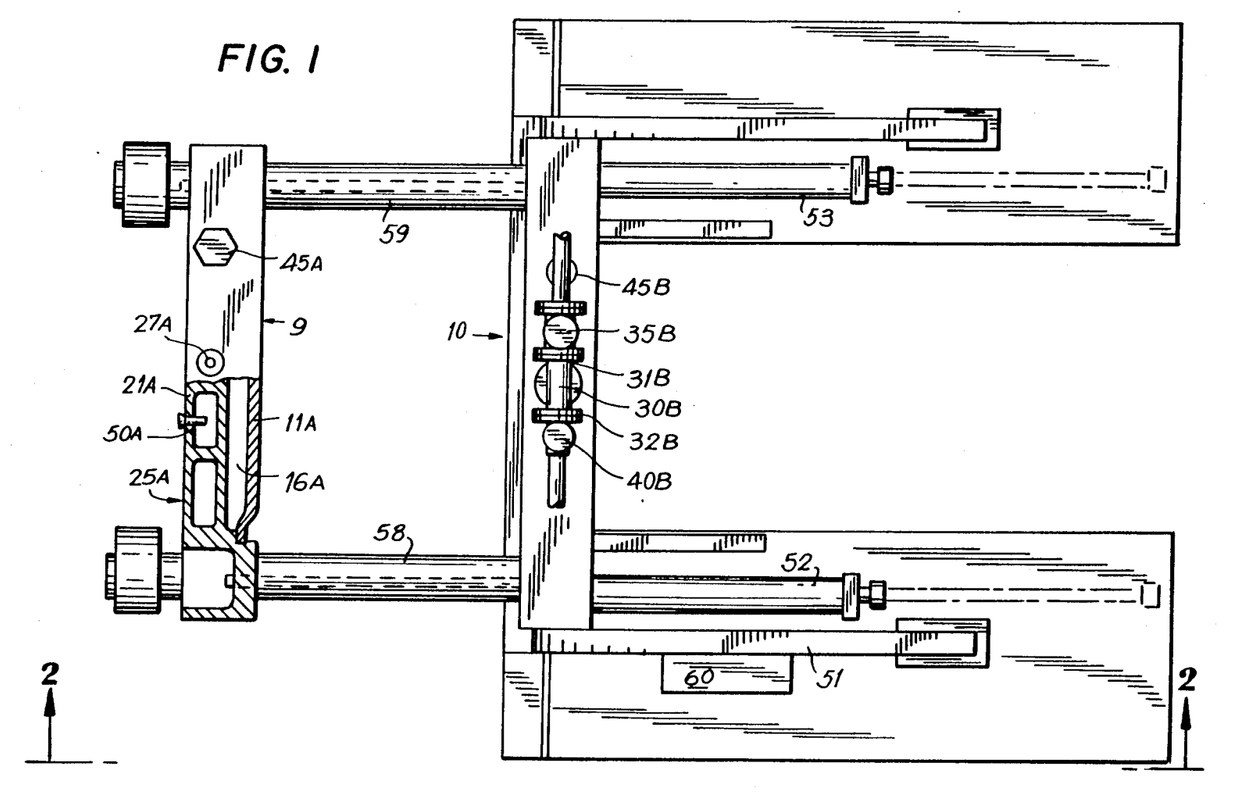
FIG. 1 is a top plan view of the apparatus of the present invention with portions of the movable mold assembly removed and cut away to show the structure thereof.
Figure 2:
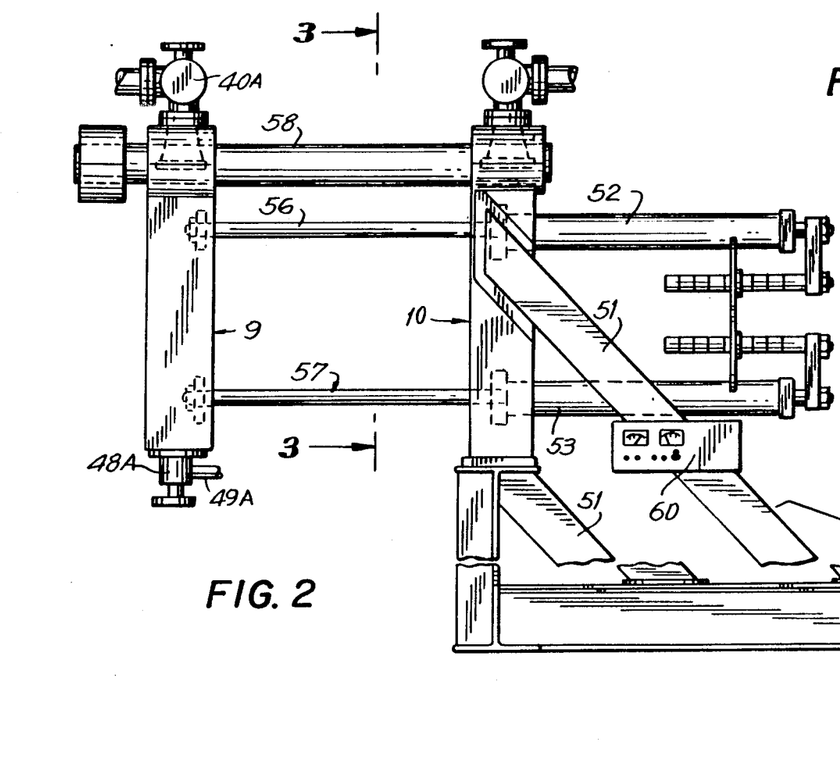
FIG. 2 is a side elevation view of the apparatus of the present invention.
Figure 3:
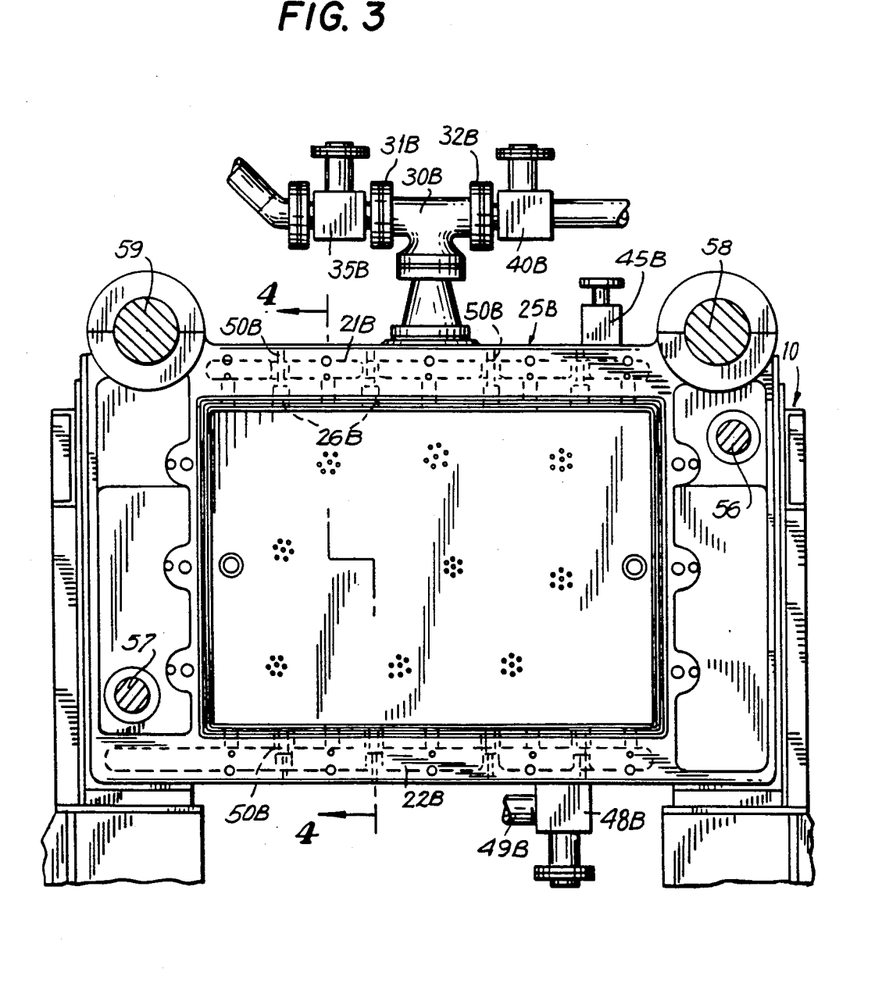
FIG. 3 is a cross section view of portions of the moveable mold assembly.
Figure 4:
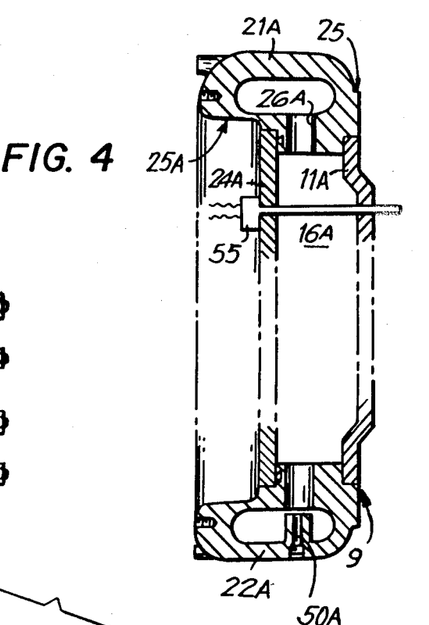
FIG. 4 is a front elevation view of the stationary mold assembly of the present invention.

Referring now to the drawings in detail, the molding apparatus of present invention illustrated in FIGS. 1 and 2 consists of a movable mold assembly 9 and a stationary mold assembly 10. Since the features accompanying the stationary and movable mold assemblies 9 and 10 are essentially the same, the corresponding features of the present invention will be given the same reference characters with those for the movable mold assembly 9 having the suffix "A" and those for the stationary mold assembly 10 having the suffix "B". Where, in the following portion of the detailed description, the suffix "A/B" is used it should be understood that the feature being described is essentially the same on both the movable mold assembly 9 and the stationary mold assembly 10.

Two mold halves, namely the left half 11A and the right half 11B will, when brought together, form a mold cavity 12 (shown schematically in FIGS. 5 through 9). By having one or both of the mold halves 11A and 11B being movable, the mold halves can be separated when the molding process is complete to remove the product formed. Each half of the mold has a number of core vents 15A/B bored through it and is mounted to a backplate 24A/B on a platen 25A/B. The frame-like platens 25A/B have upper manifolds 21A/B formed along the tops thereof and lower manifolds 22A/B formed along the bottoms thereof. Each platen 25A/B and associated manifolds 21A/B and 22A/B are preferably cast of ductile iron as one piece. When the mold halves 11A/B are mounted to the backplates 24A/B of the platens 25A/B, cavities 16A/B are formed between the molds 11A/B and the backplates 24A/B.

A temperature monitoring device 55, which may be mounted on either mold assembly 9 or 10, is shown in the figures as mounted on backplate 24A of the moveable mold assembly 9 and extends through the mold 11A and into the mold cavity 12. This temperature monitoring device 55 monitors the temperature of the beads during the heating cycle, and the product during the cooling cycle. Preferably the temperature monitoring device is an R.T.D. which responds rapidly (within milliseconds) to temperature changes and which only reacts to temperatures which occur near the end of the R.T.D. extending into the mold cavity 12.

A series of openings 26A/B in the upper manifolds 21A/B open into the cavities 16A/B behind the molds 11A/B. Inlet ports 27A/B are located at the center of the top portion of the upper manifolds 21A/B. Steam is supplied to the manifolds 21A/B through the inlet ports 27A/B during the heating cycle. Vacuum is applied to the upper manifolds 21A/B through the inlet ports 27A/B during both the heating and cooling cycles. To allow steam and vacuum to both be provided through the inlet ports 27A/B, T-fittings 30A/B are mounted at the inlet ports 27A/B. High pressure steam is supplied to one side 31A/B of the T-fittings 30A/B. To ensure that the steam is capable of adequately heating the beads, the pressure of the steam should be between 15 and 30 p.s.i. It is important to note that the area of the core vents 15A/B must be small in comparison to (approximately one quarter of) the area of the inlet ports 27A/B through which the steam supply passes to insure that the steam is maintained under the requisite pressure for rapid heating. The flow of steam to the upper manifolds 21A/B is regulated by steam valves 35A/B which can be readily switched between the open and closed positions by electronic signal from a control box 60 having known circuitry.

Vacuum is supplied to the other side 32A/B of the T-fittings 30A/B. To ensure that the vacuum is adequate to draw steam through the beads during the heating cycle and mist through the product during the cooling cycle, the strength of the vacuum pump (not shown) should be in the range of 15 to 25 inches of mercury and of sufficient cubic feet per minute capacity to maintain these pressures during most of the cycle. A water ring vacuum pump capable of efficiently handling the large amounts of steam evacuated during both the heating and cooling cycles is a preferred type of pump. The application of vacuum to the upper manifolds 21A/B is regulated by vacuum valves 40A/B which can be switched rapidly between the open and closed positions by electronic signal from the control box 60. Vacuum valves 40A/B are controlled during the heating cycle such that when steam valve 35A is open, vacuum valve 40A is closed and such that when steam valve 35B is open, when vacuum valve 40B is closed. During the cooling cycle steam valves 35A/B remain continuously closed. The valving sequence will be discussed in further detail below.

High pressure fog/mist nozzles 50A/B are mounted along both the upper manifolds 21A/B and the lower manifolds 22A/B. These nozzles 50A/B provide a fine mist which is drawn through the product during the cooling cycle. The mist must consist of droplets in the range 4 to 20 microns. Preferably a large portion of the droplets provided will be concentrated toward the lower end of the range to ensure that the mist can be easily pulled through the now fused beads which form the porous product and to ensure that the droplets are readily vaporized upon coming in contact with the hot product. Mist having the preferable droplets size range can be produced by supplying water at a pressure of 400 p.s.i. to the nozzles 50A/B. The supply of mist is controlled by valves (not shown) which remain in the open position throughout the cooling cycle and in the closed position throughout the heating cycle.

Vent openings 44A/B are located in the top portion of the upper manifolds 21A/B. These vent openings 44A/B vent the cavities 16A/B behind the molds 11A/B to the atmosphere. This allows the mist to be drawn through the product during the cooling cycle by vacuum being applied behind the other half of the mold. The vent to atmosphere is regulated by vent valves 45A/B. These vent valves 45A/B are electronically controlled by the control box 60 such that they are closed throughout the heating cycle and such that vent valve 45A is open during the cooling cycle only when vacuum valve 40A is closed and such that vent valve 45B is open during the cooling cycle only when vacuum valve 40B is closed.

Drain openings 47A/B are located in the bottom portion of the lower manifolds 22A/B. These openings 47A/B allow condensed steam from the heating cycle and drops of water accumulated from the mist during the cooling cycle to exit from the cavities 16A/B behind the molds 11A/B and the manifolds 21A/B and 22A/B. The drain openings 47A/B are regulated by drain valves 48A/B which are open briefly when the cooling cycle is completed. The drain valves 48A/B are electronically controlled by the control box 60.

The process of the present invention is practiced by the operation of the apparatus of the present invention as follows:

Once the mold assemblies 9 and 10 and hence the mold halves 11A/B are brought together and the mold cavity 12 is filled with beads, the heating cycle is initiated. According to the process of the present invention heating is accomplished by generating short pulses of steam which are drawn through the beads by vacuum. To generate a pulse of steam in one direction for example from the movable mold assembly 9 to the stationary mold assembly 10, high pressure super heated steam is supplied to the upper manifold 21A behind the left half of the mold 11A for a finite period of time while vacuum is applied to the upper manifold 21B behind the right half of the mold 11B for the same period of time. To accomplish this, steam valve 35A and vacuum valve 40B are opened while all other valves remain closed. (See FIG. 5). The finite period of time and hence the duration of the pulse, can be of any length, but preferably is from 1 to 3 seconds.

Figure 5:
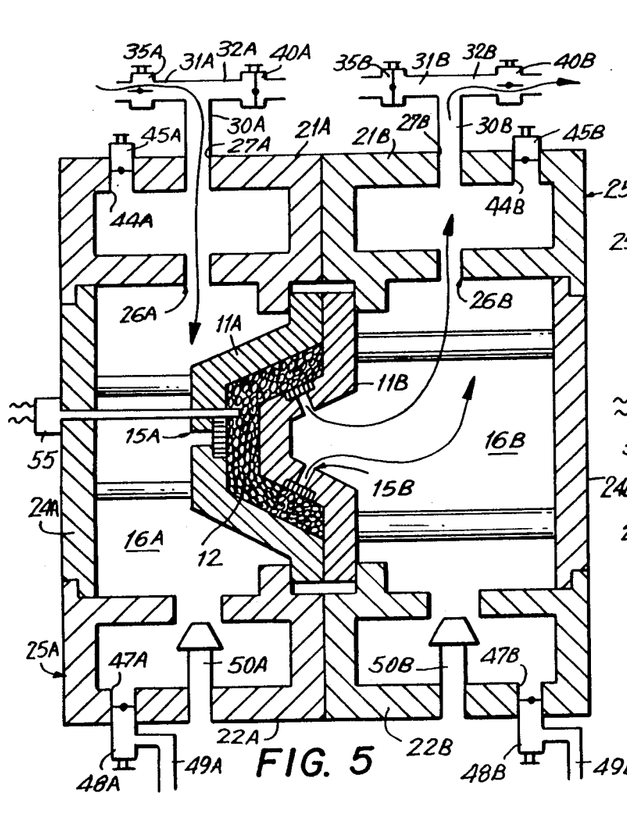
FIG. 5 is a schematic representation of the apparatus and process of the present invention showing how a pulse of steam is generated from the movable to the stationary mold assembly.

The high pressure steam rapidly and evenly fills the cavity 16A behind the mold 11A by passing through openings 26A. Since steam valve 35A is located as close as possible to the upper manifold 21A, the head of high pressure steam is maintained as close to the manifold 21A as possible, ensuring that there is an extremely short lag time between the opening of steam valve 35A and the time the cavity 16A behind the mold 11A is filled with steam. Similarly, having vacuum valve 40B as close to the upper manifold 21B as possible ensures that an extremely short lag time results between the opening of vacuum valve 40B and the time steam is drawn through the core vents 15A, the mold cavity 12 and core vents 15B.

While a pulse of sufficiently long duration in one direction would eventually result in the desired expansion and fusion of the beads, it is preferable to use a number of shorter pulses in more than one direction to accomplish the required heating more quickly and hence more efficiently. Short, "reversing" pulses keep the steam in motion throughout the heating cycle to provide rapid heat transfer from the steam to the beads. It is, therefore, desirable to have the pulse from the movable mold assembly 9 to the stationary mold assembly 10 last from 1 to 3 seconds and then create a pulse of steam from the stationary mold assembly 10 to the movable mold assembly 9 for a similar duration.

A pulse from the stationary assembly 10 to the movable mold assembly 9 is generated by supplying high pressure steam to the upper manifold 21B behind the right half of the mold 11B while vacuum is supplied to the upper manifold 21A behind the left half of the mold 11A. To accomplish this, steam valve 35B and vacuum valve 40A are open while all other valves remain closed. (See FIG. 6).

Figure 6:
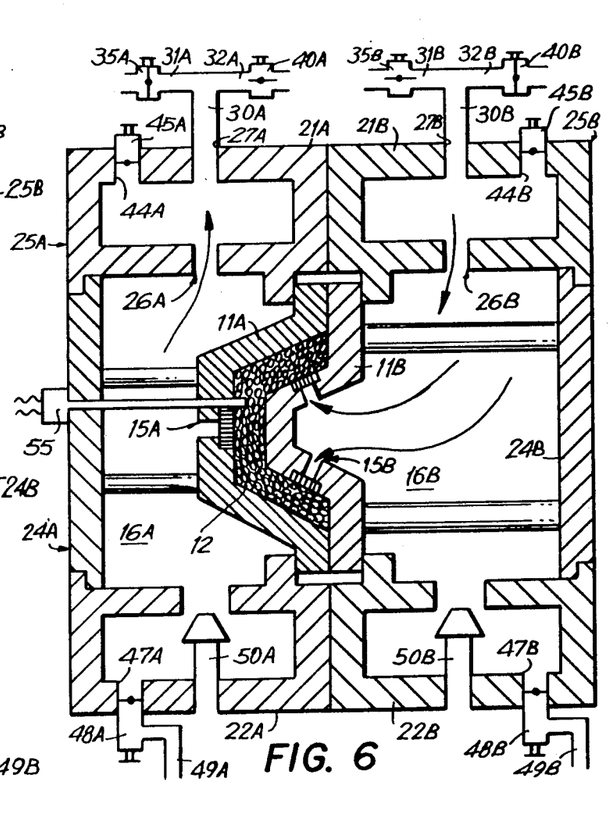
FIG. 6 is a schematic representation of the apparatus and process of the present invention showing how a pulse of steam is generated from the stationary to the movable mold assembly.

The high pressure steam rapidly and evenly fills the cavity 16B behind the mold 11B by passing through openings 26B. Again, extremely short lag times are observed since steam valve 35B and vacuum valve 40A are mounted as close as possible to the upper manifolds 21A/B. The steam is drawn through core vents 15B, the mold cavity 12 and core vents 15A.

It should be noticed that core vents 15A ad core vents 15B are not located directly across the mold cavity 12 from each other. This encourages the steam to vary its path through the beads during each pulse.

A series of such pulses, alternating in direction are generated by rapidly opening and closing the steam and vacuum valves 35 A/B and 40A/B, respectively, electronically as described above until the R.T.D. 55 which monitors the temperature of the beads, indicates that the beads have reached the required temperature (usually around 200° F.), the temperature at which the beads are sufficiently expanded and fused to form the desired styrofoam product.

The electronic control box 60 then automatically initiates the cooling cycle. According to the process of the present invention, cooling is accomplished by generating short pulses of mist which are drawn through the porous product which was formed by the expansion fusion of the beads. The means for generating pulses of mist varies slightly from the method of generating pulses of steam in that rather than supplying mist to the cavities 16A/B behind the molds 11A/B for a finite period of time, as was the case with the steam, the high pressure fog/mist nozzles 50A/B remain on during the entire cooling cycle.

To generate a pulse of mist in one direction, for example from the moveable mold assembly 9 to the stationary mold assembly 10, vacuum is applied to upper manifold 21B and upper manifold 21A is vented to the atmosphere for a finite period of time while the high pressure fog/mist nozzles 50A/B are on. To accomplish this, vacuum valve 40B and vent valve 45A are opened while all other valves remain closed. (see FIG. 7).

Figure 7:
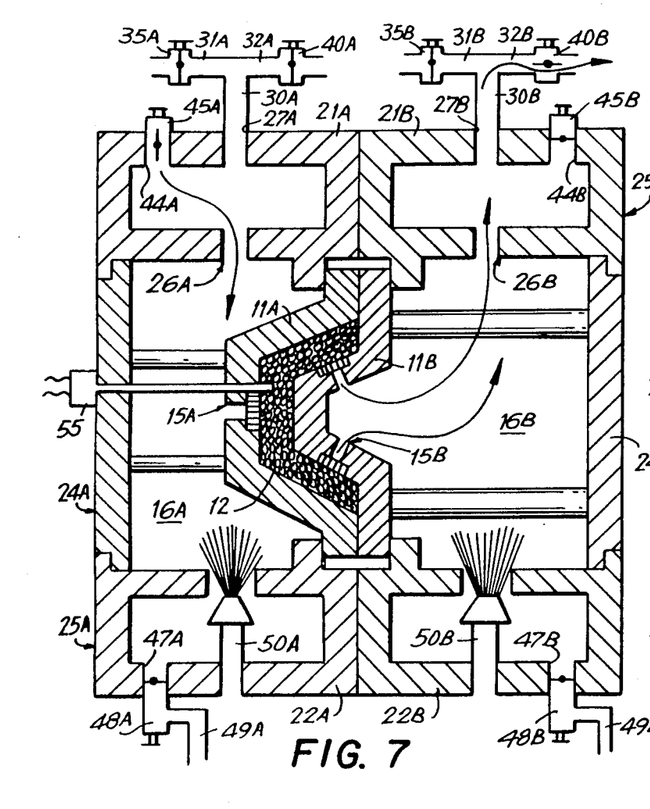
FIG. 7 is a schematic representation of the apparatus and process of the present invention showing how a pulse of mist is generated from the movable to the stationary mold assembly.
Figure 8:
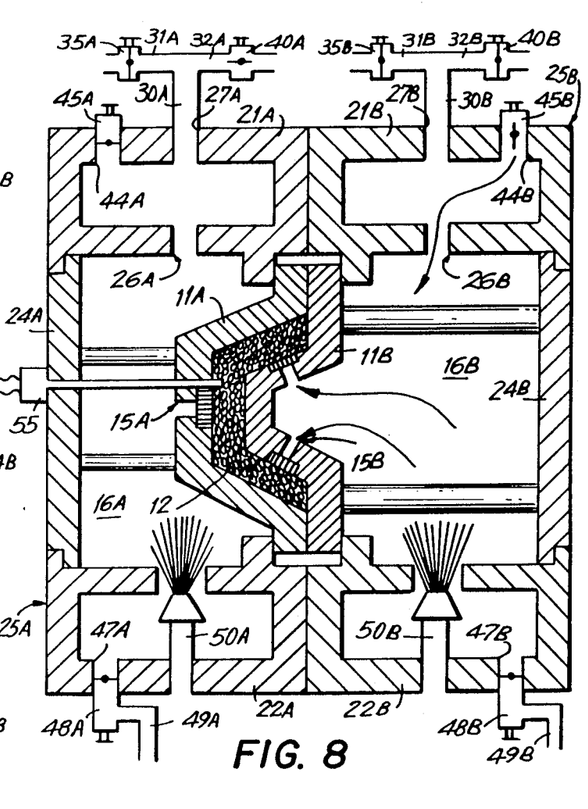
FIG. 8 is a schematic representation of the apparatus and process of the present invention showing how a pulse of mist is generated from the stationary to the movable mold assembly.

The mist fills cavities 16A/B uniformly and is drawn through core vents 15A, the porous product in the mold cavity 12 and core vents 15B. Upon contact with the hot product, the mist is instantaneously vaporized. This change of state produces an extremely efficient method for cooling the product. The vacuum draws the now hot vapor out of the product.

Although a pulse of mist in one direction of sufficiently long duration would eventually result in the required cooling of the product, it is quicker, more efficient and hence preferable to generate a number of shorter pulses lasting from 1 to 3 seconds in more than one direction to carry out the cooling cycle. These short, "reversing" pulses prevent stagnation and maintain a "fluids in motion" environment which greatly enhances the heat transfer from the product to the mist.

To generate a pulse of mist from the stationary mold assembly 10 to the moveable mold assembly 9, vacuum is applied to upper manifold 21A and upper manifold 21B is vented to atmosphere for a finite period of time with the high pressure fog/mist nozzles 50A/B remaining on. To accomplish this, vacuum valve 40A and vent valve 45B are opened while all other valves remain closed. (see FIG. 8).

A number of pulses of mist each lasting from 1-3 seconds in length are performed until the temperature monitoring device 55, which now monitors the temperature of the product, indicates that the product has been cooled sufficiently to prevent post molding expansion of the product once removed from the mold cavity 12 (typically to around 180° F.).

Figure 9:
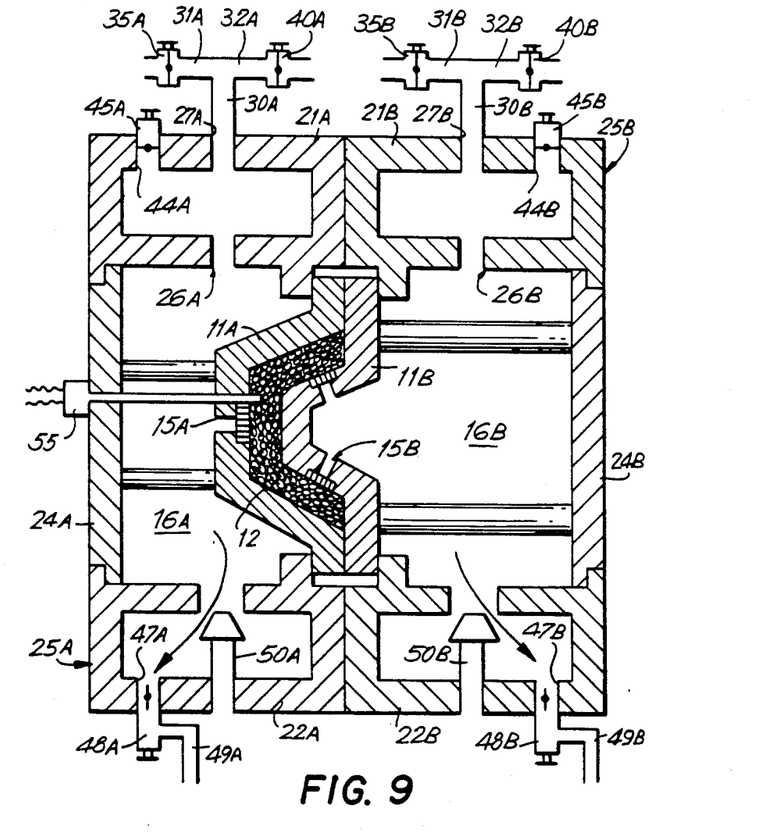
FIG. 9 is a schematic representation of the apparatus and process of the present invention showing how the apparatus is drained after molding is complete.

Once the cooling cycle is completed, drain valves 48A/B are opened simultaneously to drain any water which may have condensed from the steam during the heating cycle or accumulated from the mist during the cooling cycle. Typically only a small amount of water will accumulate requiring a draining period of only 1–2 seconds.

In a preferred embodiment of the present invention, the means for moving the movable mold assembly 9 toward and away from the stationary mold assembly 10 are mounted behind the stationary mold assembly 10. As seen in FIG. 2, hydraulic cylinders 52 and 53 are mounted behind and perpendicular to the stationary mold assembly 10. Cylinder rods 56 and 57 of cylinders 52 and 53 extend through platen 25B and are affixed to platen 25A. When these cylinder rods 56 and 57 are extended out of cylinders 52 and 53 the mold assemblies 9 and 10 are separated. When cylinder rods 56 and 57 are retracted into cylinders 52 and 53 the mold assemblies 9 and 10 are brought together and the molding process can begin. Activation of cylinders 52 and 53 can, of course, be controlled by control box 60.

Support beams 58 and 59 are provided which guide the moveable mold assembly 9 as it slides toward the stationary mold assembly 10 and also provide support for the movable mold assembly 9. All support means 51 can thus be located behind the stationary mold assembly 10 and no other support structures are required for the moveable mold assembly 9. This allows easy access to the product once molding is complete and facilitates positioning a conveyor system (not shown) below the movable mold assembly 9 to convey ejected products away from the molding device. This configuration also allows the mold halves 11A/B to be wheeled directly under the platens 25A/B for easy installation.

Cylinder rod 56 is affixed to the upper portion of platen 25A on the side of the platen 25A from which the device is operated, and cylinder rod 57 is affixed to the lower portion of the platen 25A on the opposite side of the device. This orientation of the cylinder rods 56 and 77 provides the needed support and facilitates access to the mold 11A/B for part removal, mold inspection and any maintenance requirements.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims. The method and process of the invention may be applicable to other expanding polymer and molding processes as is presently or prospectively known in the art. For example, expandable polyethylene beads may be substituted for the polystyrene beads of the invention. Thus, it is intended that the present invention cover the modifications and variations of this invention provided that they come within the scope of the appended claims and their equivalents.

What is claimed is:

1. A device for molding beads of expandable polystyrene into articles, the device comprising;
    a mold having a plurality of members forming a mold cavity, said mold members having core vents formed therein;

means for introducing beads of expandable polystyrene into said mold cavity;

a plurality of platens corresponding in number to said mold members to which each said member is affixed such that a steam cavity is created between each said member and platen;

means for supplying steam to each said steam cavity;

means for applying reduced pressure to each said steam cavity;

means for supplying mist to each said steam cavity;

means for regulating the supply of steam and application of reduced pressure;

control means for activating said regulating means and generating pulses of steam and pulses of mist which travel from one steam cavity through the mold cavity to another steam cavity; and means for removing the molded article.

2. A device as in claim 1 wherein said means for supplying steam and means for applying reduced pressure comprise:
a manifold formed in a platen;
an inlet port formed in said manifold;
a T-fitting mounted at said inlet port;
a steam valve mounted on one side of said T-fitting;
a vacuum valve mounted on one side of said T-fitting;
a source of high pressure steam; and
a vacuum pump.

3. A device as in claim 1 wherein said means for supplying mist further comprises:
a plurality of fog/mist nozzles; and
a source of water.

4. A device as in claim 1 wherein said water source provides water at a pressure in the range 200–400 p.s.i.

5. A device as in claim 1 wherein said control means generate pulses of steam and mist of 1 to 3 seconds in duration.

6. A device as in claim 1 further comprising:
a temperature monitoring device which monitors the temperature of the expandable polystyrene beads within the mold cavity.

7. A device as in claim 6 wherein the control means activates the regulating means to generate pulses of steam until said temperature monitoring device indicates the beads have been heated to a predetermined temperature and subsequently generate pulses of mist until said beads have been cooled to a second predetermined temperature.

8. A device as in claim 7 wherein said temperature monitoring device is a resistance temperature device.

* * * * *